US012241438B1

(12) United States Patent
Won

(10) Patent No.: US 12,241,438 B1
(45) Date of Patent: Mar. 4, 2025

(54) ENGINE INTAKE DEVICE FOR FORKLIFTS

(71) Applicant: Doosan Bobcat Korea Co., Ltd., Incheon (KR)

(72) Inventor: Jongsik Won, Incheon (KR)

(73) Assignee: Doosan Bobcat Korea Co., Ltd., Incheon (KR)

( * ) Notice: Subject to any disclaimer, the term of this patent is extended or adjusted under 35 U.S.C. 154(b) by 0 days.

(21) Appl. No.: 18/510,309

(22) Filed: Nov. 15, 2023

(51) Int. Cl.
*F02M 35/12* (2006.01)
*B66F 9/075* (2006.01)

(52) U.S. Cl.
CPC .... *F02M 35/1255* (2013.01); *F02M 35/1222* (2013.01); *F02M 35/1288* (2013.01); *B66F 9/07554* (2013.01)

(58) Field of Classification Search
CPC ........... F02M 35/1255; F02M 35/1222; F02M 35/1288; B66F 9/07554
See application file for complete search history.

(56) References Cited

U.S. PATENT DOCUMENTS

| | | | | |
|---|---|---|---|---|
| 3,721,318 A * | 3/1973 | Warrender | B66F 9/082 | 187/222 |
| 6,450,141 B1 | 9/2002 | Sakuma | | |
| 2008/0053749 A1* | 3/2008 | Utsunomiya | G03B 21/16 | 181/284 |
| 2009/0283346 A1* | 11/2009 | Katae | B60L 58/24 | 180/68.5 |

FOREIGN PATENT DOCUMENTS

| | | | |
|---|---|---|---|
| DE | 10 2012 105883 | A1 | 1/2014 |
| EP | 3 121 420 | A1 | 1/2017 |
| JP | S52-111841 | U | 8/1977 |
| JP | S58-204917 | A | 11/1983 |
| JP | H04-5122 | A | 1/1992 |
| JP | H07-16040 | Y2 | 4/1995 |
| JP | 2011-52954 | A | 3/2011 |
| KR | 10-2001-0054472 | A | 7/2001 |
| KR | 10-2015-0066840 | A | 6/2015 |
| KR | 10-2015-0120339 | A | 10/2015 |

OTHER PUBLICATIONS

European Search Report issued in European Application No. 23207422.9 dated Mar. 21, 2024.
Notification of Submission of Comments issued in Korean Application No. 10-2022-0071330 dated Mar. 25, 2024.
Korean patent office, "KR Notice of Allowance," issued in connection with Korean Patent Application No. 10-2022-0071330 dated Oct. 18, 2024 (03 pages).

* cited by examiner

*Primary Examiner* — Jacob M Amick
*Assistant Examiner* — Charles J Brauch
(74) *Attorney, Agent, or Firm* — Holland & Hart LLP

(57) ABSTRACT

Disclosed herein is an engine intake device for a forklift. The engine intake device for a forklift includes an intake flow path passing through a counterweight of the forklift, and an intake pipe connected to the intake flow path to provide intake air to an engine of the forklift.

9 Claims, 10 Drawing Sheets

ENGINE INTAKE DEVICE FOR FORKLIFTS

TECHNICAL FIELD

The disclosure relates to an engine intake device for forklifts.

BACKGROUND

Generally, forklifts are industrial vehicles used to lift and transport heavy objects, and are classified into engine-based forklift and electric-based forklift, depending on their power source.

An engine-based forklift typically includes a body frame with an engine installed therein. A mast assembly including a fork is installed at a front side of the body frame, and a seat for a driver is provided at an upper portion of the body frame.

Meanwhile, a forklift in which an engine and a driver's seat are placed close to each other causes the intake noise for driving the engine to be excessively transmitted to the driver.

In particular, in the case of a forklift equipped with an overhead guard, the intake noise from the engine is not easily discharged to the outside and is concentrated in a direction of the driver's seat, so that the level of noise transmitted to the driver may be further increased.

To solve such a situation, it is possible to install an additional resonator to reduce the intake noise of the engine. However, to secure the installation space for the resonator, it is necessary to increase the size of an engine room or prepare a separate installation space for the resonator, thereby reducing decreasing the space usability.

SUMMARY

An aspect of the disclosure is to provide an engine intake device for a forklift capable of effectively reducing the intake noise of an engine without reducing the space usability of the forklift.

Additional aspects of the disclosure are set forth in part in the description which follows and, in part, should be understood from the description, or may be learned by practice of the disclosure.

In accordance with an aspect of the disclosure, an engine intake device for a forklift includes an intake flow path passing through a counterweight of the forklift, and an intake pipe connected to the intake flow path to provide intake air to an engine of the forklift.

The forklift may further include a body frame on which the engine is mounted and a seat of a driver located on an upper portion of the body frame, and the counterweight may be disposed on a rear side of the body frame, and the intake flow path may include an inlet provided on a side of the counterweight.

The engine intake device for forklifts may further include a branch flow path branching off from a midpoint of the intake flow path so as to communicate with the intake flow path and extending to an outer surface of the counterweight, and a cap configured to close at least a portion of the branch flow path such that a resonance chamber is formed through the branch flow path.

The cap may be inserted at an adjustable insertion depth into a distal end of an extension direction of the branch flow path from the outside of the counterweight.

The cap may be inserted into a distal end of an extension direction of the branch flow path from the outside of the counterweight, and the resonance frequency of the resonance chamber may be adjusted according to a length of the cap.

The branch flow path may include a bending section.

The intake flow path may be formed such that at least an inlet side thereof is inclined toward the ground.

A sound-absorbing material may be provided on an inner surface of the intake flow path.

An inner surface of the intake flow path may be roughened.

BRIEF DESCRIPTION OF THE DRAWINGS

These and/or other aspects of the disclosure should be apparent and more readily appreciated from the following description of the embodiments, taken in conjunction with the accompanying drawings, in which.

DETAILED DESCRIPTION

Figure 1:
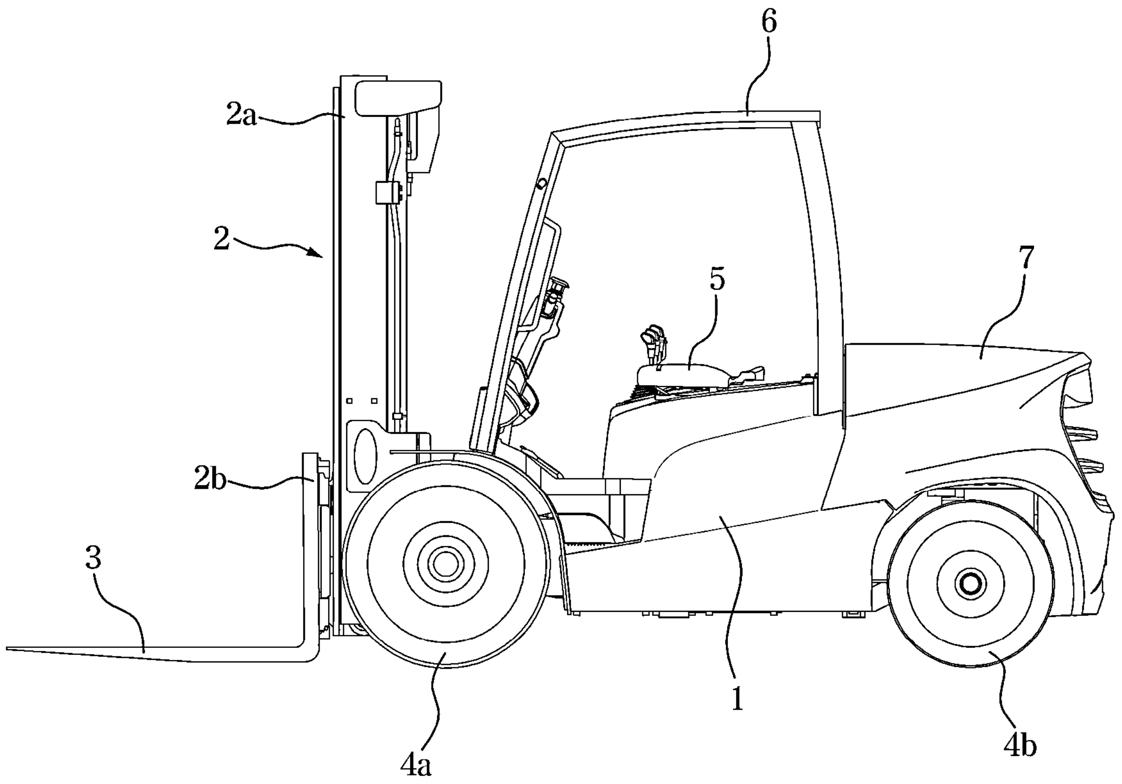
FIG. 1 shows a configuration of a forklift to which an engine intake device for forklifts is applied according to an exemplary embodiment of the disclosure.

Reference is made below in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, primary, secondary, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the disclosure are described in detail with reference to the accompanying drawings.

FIG. 1 shows a configuration of a forklift to which an engine intake device 10 for forklift according to an exemplary embodiment of the disclosure is applied.

Figure 2:
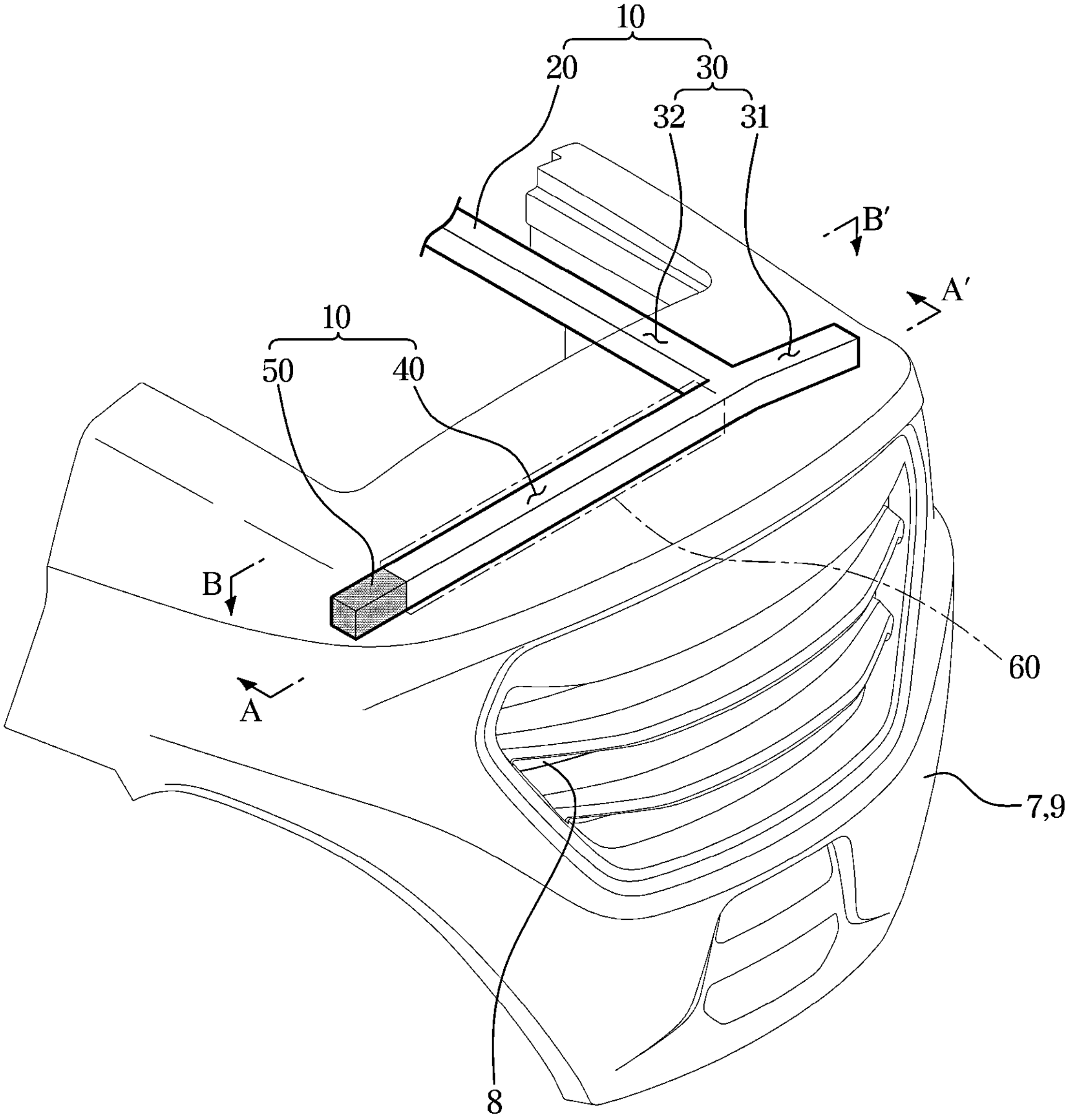
FIG. 2 shows a structure of a counterweight of the forklift to which the engine intake device for forklifts is applied according to an exemplary embodiment of the disclosure.

As shown in FIGS. 1 and 2, a forklift is provided with a body frame 1 of a vehicle (e.g., forklift) on which an engine is installed, and a mast assembly 2 may be mounted on a front side of the body frame 1.

The mast assembly 2 may include a mast rail 2*a* disposed in a vertical direction, and a carriage 2*b* that moves upward and downward along the mast rail 2*a*.

The carriage 2*b* may move up and down along a chain installed on the mast rail 2*a*, and a pair of forks 3 for lifting a load is mounted on a front side of the carriage 2*b*, the width therebetween being adjustable from side to side.

Front and rear wheels 4*a* and 4*b* may be disposed on the front and rear sides of the body frame 1, respectively, and a seat of a driver 5 may be located on an upper portion of the body frame 1. An overhead guard 6 may be installed above the driver's seat 5 to protect the driver.

An exhaust manifold (not shown) and an intake manifold (not shown) may be installed in the engine, and an exhaust pipe (not shown) and an intake pipe 20 to guide exhaust and intake air may be connected to the exhaust manifold and the intake manifold, respectively.

An air cleaner (not shown) may be interposed between the intake pipe 20 and the intake manifold to filter the intake air guided to the intake manifold.

Furthermore, a counterweight 7 may be mounted on a rear side of the body frame 1. The counterweight 7 may be disposed on an upper portion side of the rear wheel 4*b*.

The counterweight 7 may serve to shift the center of gravity of a load, which is concentrated at the front side of a body of the vehicle, to the rear side, so that the load may be stably transported and lifted and lowered. The counterweight 7 may include a weight body 8, and a cover 9 made of a resin material that covers the weight body 8.

Figure 3:
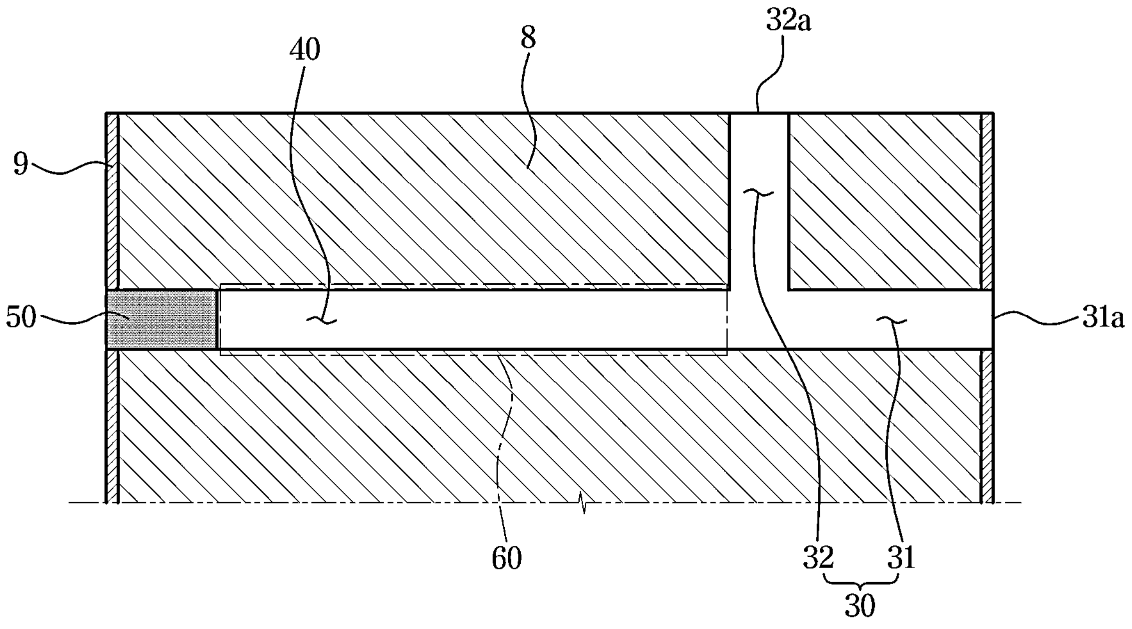
FIG. 3 is a cross-sectional view showing a structure of FIG. 2 taken along the cutting line A-A.
Figure 4:
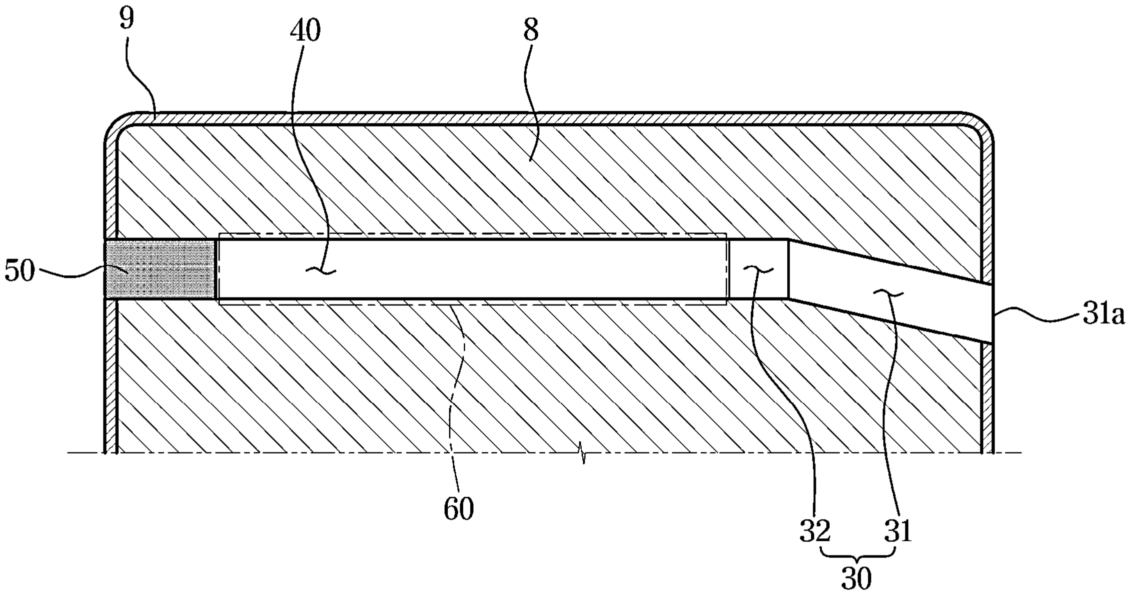
FIG. 4 is a cross-sectional view showing a structure of FIG. 3 taken along the cutting line B-B.

On the other hand, as shown in FIGS. 2 to 4, the counterweight 7 is provided with an intake flow path 30 that passes through the counterweight 7, and the intake pipe 20 may be connected to the intake flow path 30 to supply the intake air guided through the intake flow path 30 to the engine. The intake pipe 20 may be coupled to the counterweight 7 such that its inlet is connected to an outlet 32*a* of the intake flow path 30 passing through the counterweight 7.

The intake flow path 30 may be provided to have a polygonal cross-section, such as a circle or a rectangle.

The intake flow path 30 and the intake pipe 20, together with an air cleaner (not shown) and an intake manifold (not shown), may form the engine intake device 10 for forklifts that provides the intake air to the engine.

The intake flow path 30 may form an intake channel together with the intake pipe 20, and an inlet 31*a* of the intake flow path 30 may form an entrance to the intake channel.

Accordingly, the intake flow path 30 formed in the counterweight 7 may increase a distance between the entrance of the intake channel and the driver's seat 5 by moving the entrance of the intake channel toward a rear side of the driver's seat 5. As a result, the intake noise transmitted from the entrance of the intake channel to the driver's seat 5 may be reduced.

In addition, the counterweight 7, which is equipped with the intake flow path 30 and serves as a sound barrier, may increase a diffraction attenuation value of the intake noise and increase the sound insulation effect by mass effect, thereby preventing the intake noise from being transmitted to the driver's seat 5.

In addition, the intake flow path 30 formed in the counterweight 7 may increase a flow passage of intake air so that intake air with sufficiently reduced noise is supplied to the engine, thereby contributing to reduce the intake noise generated by the engine.

Considering the typical shape of the counterweight 7, which is formed with a longer length in a width direction of the forklift than the length in a traveling direction of the forklift, it may be desirable to provide the inlet 31*a* of the intake flow path 30 on a side of the counterweight 7 so that the intake flow path 30 may be elongated on the counterweight 7 along the width direction of the forklift.

The outlet 32*a* of the intake flow path 30 may be formed at a front side of the counterweight 7 to facilitate guiding the intake air to the engine disposed at the front side.

The intake flow path 30 may be formed so that at least the inlet 31a side is inclined toward the ground to prevent foreign substances, such as rainwater from entering the intake flow path 30.

The intake flow path 30 may include an inlet section 31 extending a predetermined length from the inlet 31*a* into the counterweight 7, and an outlet section 32 bent and extending from the inlet section 31 toward the outlet 32*a*. The inlet section 31 on which the inlet 31*a* is formed may be entirely inclined downward toward the ground to prevent foreign substances from entering.

The weight body 8 of the counterweight 7 may be made of casting. When the weight body 8 is prepared by casting, the intake flow path 30 may be provided integrally with the weight body 8 in the moulding of the weight body 8 by adding a structure for forming the intake flow path 30 to a mould for casting the weight body 8.

In the intake flow path 30, the cover 9 side of the counterweight 7 may be provided integrally with the cover 9 in the moulding of the cover 9 by machining a hole in the injection-molded cover 9 or by adding a structure to the mould for injection moulding the cover such that a hole corresponding to the cross-sectional shape of the intake flow path 30 is formed.

The method of manufacturing the weight body 8 or moulding the intake flow path 30 is not limited to the method described above. The intake flow path 30 may be prepared by applying various moulding methods depending on the manufacturing method of the weight body 8 in consideration of the moulding efficiency.

For example, the weight body 8 may be provided by filling the inside of a metal box with heavy materials, such as slag or mercury, and the intake flow path 30 may be provided in the weight body 8 by machining additional holes in the manufactured weight body 8.

Furthermore, the engine intake device 10 for forklifts may further include a branch flow path 40 that branches off from a midpoint of the intake flow path 30 so as to communicate with the intake flow path 30 and extends to an outer surface of the counterweight 7, and a cap 50 that closes at least a portion of the branch flow path 40 so as to form a resonance chamber 60 for reducing intake noise passing through the intake flow path 30.

The resonance chamber 60 is designed to reduce flow noise of intake air flowing along the intake flow path 30, and may be provided such that its resonance frequency matches the noise frequency of the intake flow path 30.

The cap 50 may be inserted from the outside of the counterweight 7 into the branch flow path 40 to block communication between the branch flow path 40 and the outside of the counterweight 7.

The cap 50 may be manufactured separately from the weight body 8 and assembled to be inserted into the branch flow path 40.

Figure 5:
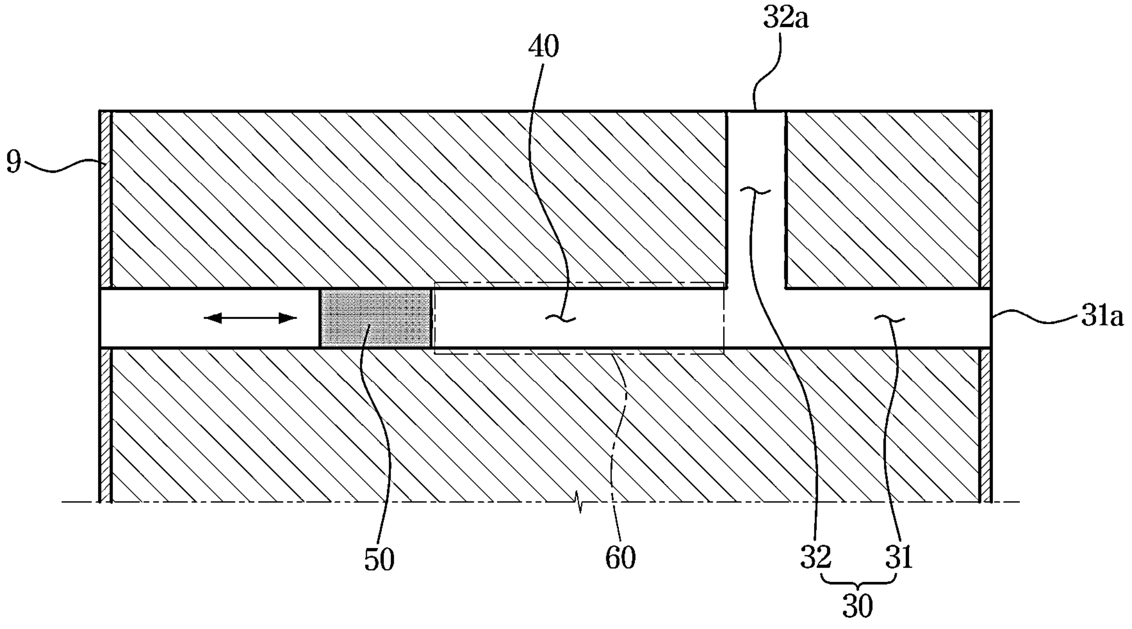
FIG. 5 shows a state in which a position of a cap in FIG. 3 is adjusted.

As shown in FIG. 5, the cap 50 may be inserted at an adjustable insertion depth into a distal end of an extension direction of the branch flow path 40 from the outside of the counterweight 7.

Accordingly, the resonance frequency of the resonance chamber 60 may vary depending on an insertion position of the cap 50 inserted into the branch flow path 40.

As a result, by adjusting the insertion position of the cap 50 inserted into the branch flow path 40 to tune the resonance frequency of the resonance chamber 60 to match the noise frequency of the intake flow path 30, the effect of reducing intake noise by the resonance chamber 60 may be increased.

Figure 6:
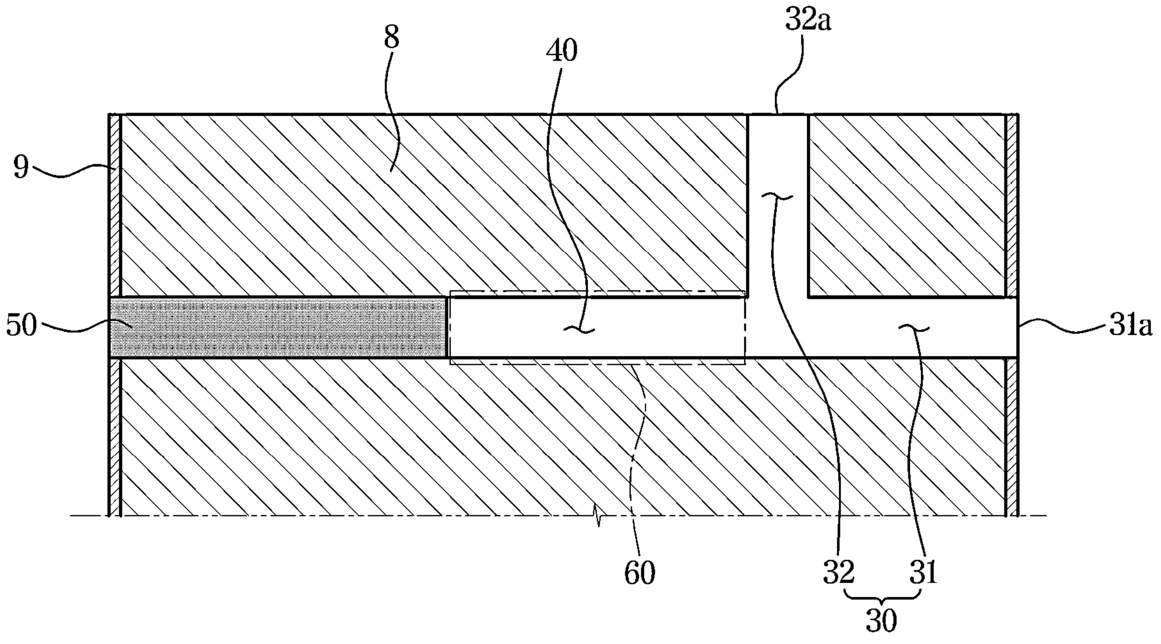
FIG. 6 shows a modified example of a membrane in the engine intake device for forklifts according to an exemplary embodiment of the disclosure.

As shown in FIG. 6, the resonance frequency of the resonance chamber 60 may be adjusted through a length of the cap 50 inserted into the branch flow path 40.

For example, the cap 50 is inserted into the branch flow path 40 such that one end in a longitudinal direction of the cap 50 is aligned with the end in the extension direction of the branch flow path 40, but the length of the cap 50 closing the branch flow path 40 may be varied. This may allow the resonance frequency of the resonance chamber 60 and the noise frequency of the intake flow path 30 to be tuned to match.

At this time, an end surface of the cap 50 exposed to the outside of the counterweight 7 may be treated so that no step is formed between the end surface of the cap 50 and the outer surface of the counterweight 7 therearound, thereby preventing the resonance chamber 60 from impairing the aesthetics of the appearance of the counterweight 7.

The branch flow path 40 may be provided integrally with the weight body 8 when moulding the weight body 8 together with the intake flow path 30, or may be machined to communicate with the intake flow path 30 in the moulded weight body 80.

In addition, in the branch flow path 40, the cover 9 side of the counterweight 7 may be provided integrally with the cover 9 in the moulding of the cover 9 by machining a hole in the injection-molded cover 9 or by adding a structure to the mould for injection moulding the cover such that a hole corresponding to the cross-sectional shape of the branch flow path 40 is formed.

On the other hand, if the frequency of the intake noise corresponds to a relatively low frequency, it may be necessary to form a somewhat longer length of the resonance chamber 60 in order to increase the attenuation effect of the intake noise.

Figure 7:
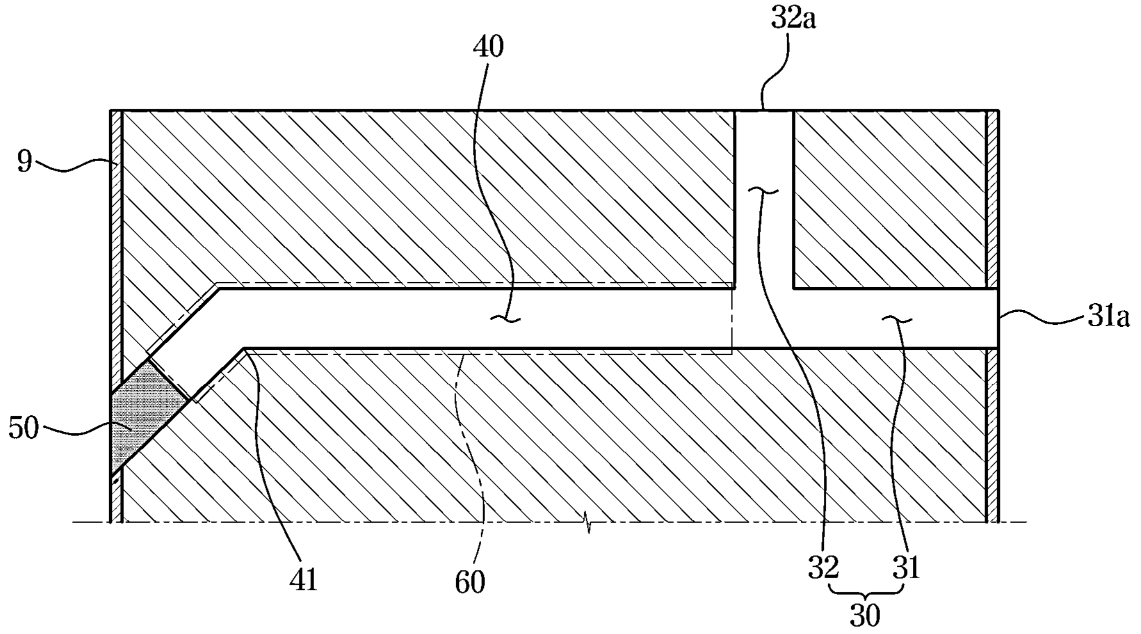
FIGS. 7 and 8 show modified examples of branch flow paths in the engine intake device for forklifts according to an exemplary embodiment of the disclosure.
Figure 8:
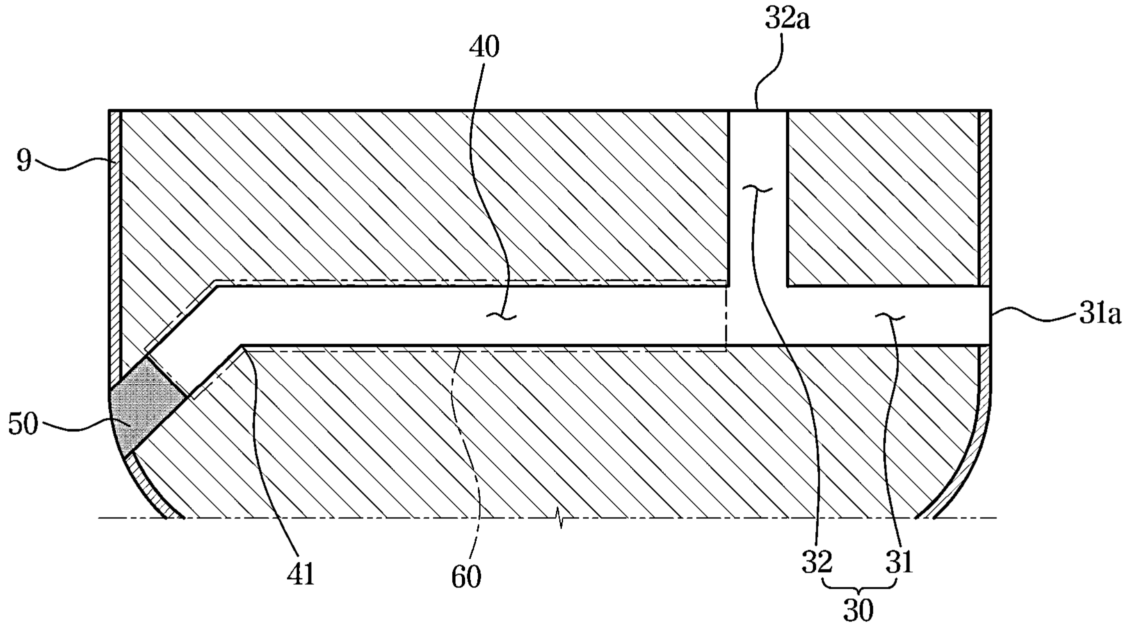

To this end, as shown in FIGS. 7 and 8, the branch flow path 40 may be provided with a bending section 41 to ensure a longer length of the resonance chamber 60.

At this time, the end surface of the cap 50 exposed to the outside of the counterweight 7 is also treated so that no step is formed between the end surface of the cap 50 and the outer surface of the counterweight 7 therearound, thereby preventing the resonance chamber 60 from impairing the aesthetics of the appearance of the counterweight 7.

As shown in FIG. 8, when the outer surface of the counterweight 7 around the cap 50 has a curved shape, the end surface of the cap 50 may have a curved shape with the same curvature as the outer surface of the counterweight 7, so that the end surface of the cap 50 may match the outer surface of the counterweight 7 therearound.

Figure 9:
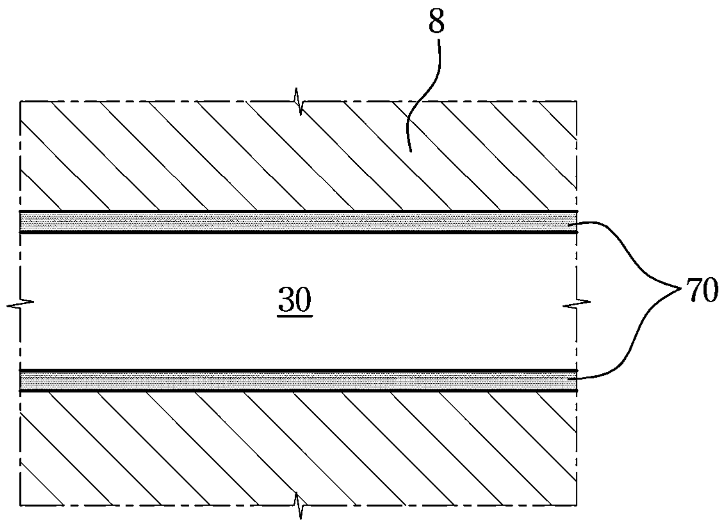
FIG. 9 shows a modified example of an intake flow path in the engine intake device for forklifts according to an exemplary embodiment of the disclosure.

Also, as shown in FIG. 9, the intake flow path 30 may be provided with a sound-absorbing material 70 on its inner surface to improve sound-absorbing performance.

The sound-absorbing material 70 may be made of foam-based resin or fabric-based fabric and may be attached to the inner surface of the intake flow path 30.

Figure 10:
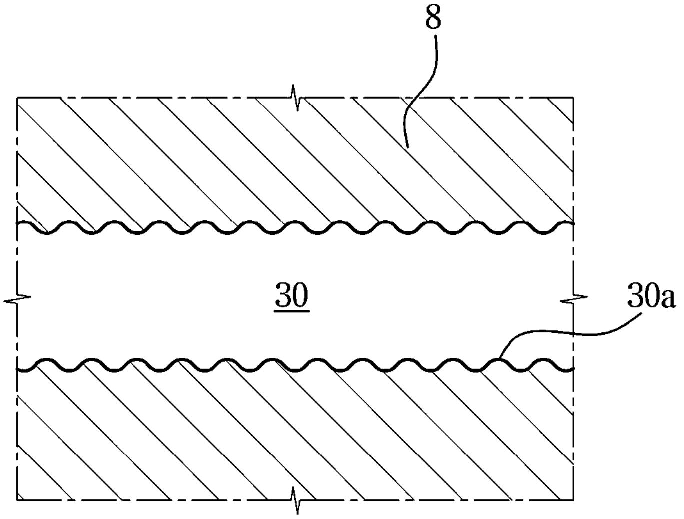
FIG. 10 shows another modified example of an intake flow path in the engine intake device for forklifts according to an exemplary embodiment of the disclosure.

Furthermore, as shown in FIG. 10, the inner surface of the intake flow path 30 may be roughened. For example, the inner surface of the intake flow path 30 may be roughened to form an uneven surface 30*a*.

The rough surface-treated inner surface of the intake flow path 30 may induce a flow of fluid such that the fluid passing through the intake flow path 30 creates turbulence, thereby increasing the flow resistance of the fluid. As a result, the flow noise of the fluid may be reduced.

As is apparent from the above, various embodiments of the present disclosure may provide the engine intake device for forklifts capable of improving visibility for the driver and a safety for pedestrians while considering power consumption.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. An engine intake device for a forklift, comprising:
- an intake flow path passing through a counterweight of the forklift;
- an intake pipe connected to the intake flow path to provide intake air to an engine of the forklift; and
- an intake manifold connected to the intake pipe.

2. The engine intake device of claim 1, wherein
- the forklift further includes a body frame on which the engine is mounted, and a seat of a driver located on an upper portion of the body frame,
- the counterweight is disposed on a rear side of the body frame, and the intake flow path includes an inlet provided on a side of the counterweight.

3. The engine intake device of claim 1, further comprising:

a branch flow path branching off from a midpoint of the intake flow path so as to communicate with the intake flow path and extending to an outer surface of the counterweight, and a cap configured to close at least a portion of the branch flow path such that a resonance chamber is formed through the branch flow path.

4. The engine intake device of claim 3, wherein the cap is inserted at an adjustable insertion depth into a distal end of an extension direction of the branch flow path from the outside of the counterweight.

5. The engine intake device of claim 3, wherein the cap is inserted into a distal end of an extension direction of the branch flow path from the outside of the counterweight, and the resonance frequency of the resonance chamber is adjusted according to a length of the cap.

6. The engine intake device of claim 3, wherein the branch flow path includes a bending section.

7. The engine intake device of claim 1, wherein the intake flow path is formed such that at least an inlet side thereof is inclined toward the ground.

8. The engine intake device of claim 1, wherein a sound-absorbing material is provided on an inner surface of the intake flow path.

9. The engine intake device of claim 1, wherein an inner surface of the intake flow path is roughened.

* * * * *